United States Patent [19]

Funada et al.

[11] Patent Number: 4,769,801
[45] Date of Patent: Sep. 6, 1988

[54] FOCUS SERVO CONTROL DEVICE FOR OPTICAL DISKS HAVING SERVO OFFSET ERROR ELIMINATION

[75] Inventors: Saburo Funada; Masanori Doi, both of Tokyo, Japan

[73] Assignee: Olympus Optical Co., Ltd., Tokyo, Japan

[21] Appl. No.: 825,228

[22] Filed: Feb. 3, 1986

[30] Foreign Application Priority Data

Feb. 15, 1985 [JP] Japan .................................. 60-29142

[51] Int. Cl.$^4$ .............................................. G11B 7/00
[52] U.S. Cl. ...................................... 369/45; 250/201; 369/46
[58] Field of Search ................. 250/201 DF; 358/342; 369/43–47

[56] References Cited

U.S. PATENT DOCUMENTS

| 3,896,304 | 7/1975 | Aoki et al. | ........................... 250/201 |
| 4,128,847 | 12/1978 | Roullet et al. | . |
| 4,439,848 | 3/1984 | Ceshkovsky et al. | . |
| 4,488,275 | 12/1984 | Ceshkovsky et al. | ................ 369/44 |

Primary Examiner—Robert L. Richardson
Attorney, Agent, or Firm—Frishauf, Holtz, Goodman & Woodward

[57] ABSTRACT

A focus servo control device has a focus driver for driving an optical system having an objective lens, and a servo control section for detecting that the optical system is within a focus servo control range. A focus servo control loop is formed in response to a detection signal representing that the optical system is in the focus servo control range, and the optical system is driven under servo control until the amount of light reflected by the optical disk is detected as a maximum.

6 Claims, 5 Drawing Sheets

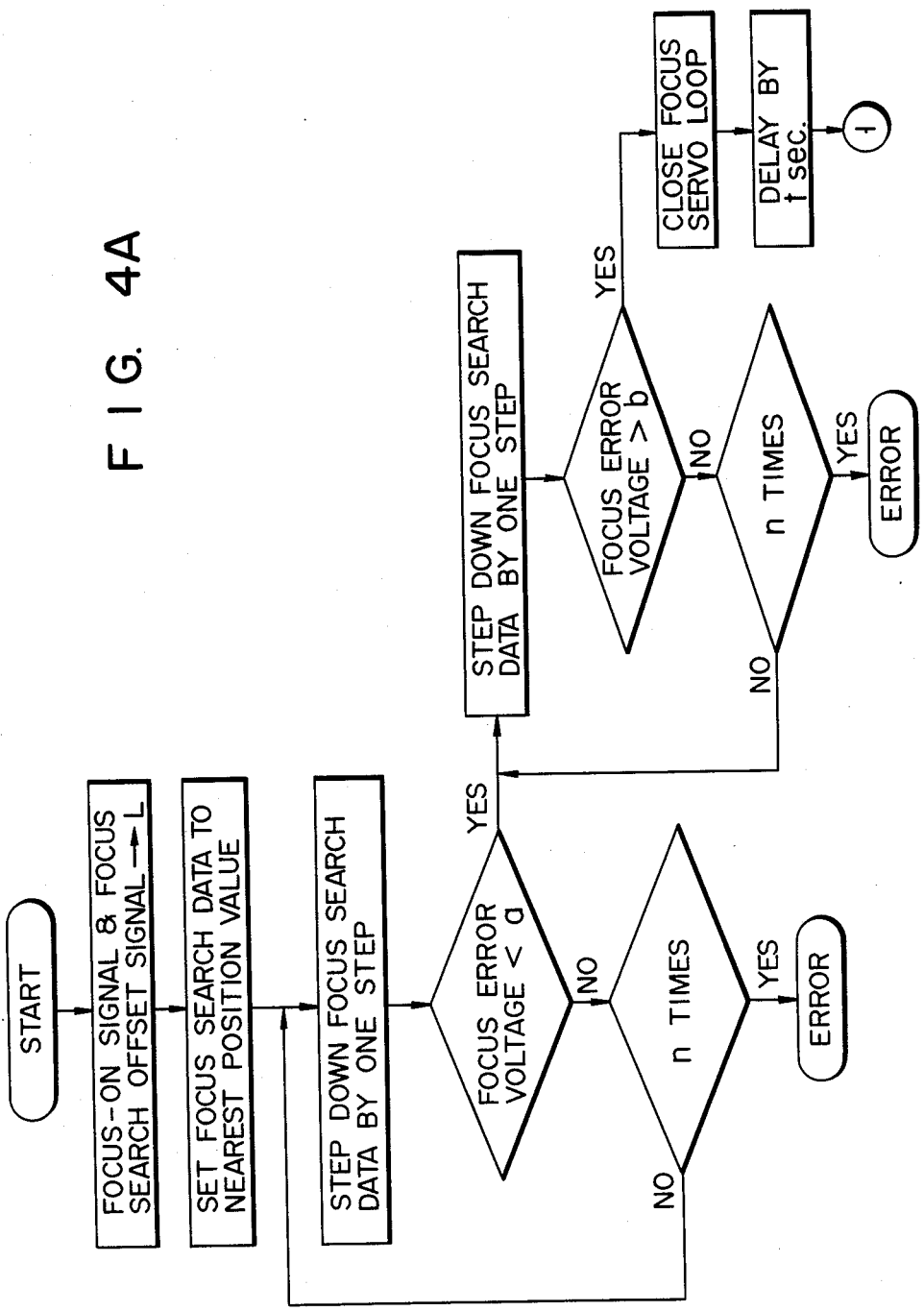

FOCUS SERVO CONTROL DEVICE FOR OPTICAL DISKS HAVING SERVO OFFSET ERROR ELIMINATION

BACKGROUND OF THE INVENTION

The present invention relates to a focus servo control device for an optical disk apparatus.

When information is recorded on or reproduced from an optical disk in a conventional optical disk apparatus, the optical disk is rotated while being irradiated with a laser beam. The laser beam must always be focused on the recording surface of the optical disk. From a microminiaturization point of view, the surface of the optical disk can be seen not to be a completely flat surface. Indeed, undulations cause the recording surface to move vertically while the disk is being rotated, making accurate focusing impossible with a fixed focusing device. For this reason, a focus servo control is required. Since a lens with a focal depth of $\pm 2$ $\mu$m is used as an objective lens in the focus servo control, the laser beam must be focused on the recording surface of the optical disk to a precision of $\pm 2$ $\mu$m.

The servo control comprises of three functional sections (a) a focusing error detecting section; (b) a servo amplifier section; and (c) a focusing section. A focus error is detected by section (a). A detection signal is amplified and its frequency characteristics controlled by section (b). A focusing mechanism is driven by section (c). The focusing mechanism has a member that moves upon supply of an excitation current, in the same manner as the voice coil of a speaker. The objective lens is moved vertically by the member, thereby performing focusing.

With a conventional focus servo control system, a focus servo circuit is operated when a focusing mechanism-an objective lens-is moved to a position within a focus servo control range. However, offset errors produced by an optical system and an electrical circuit are effectively superposed on the focus error signal. Therefore, a proper focus state cannot be maintained because of the offset errors.

SUMMARY OF THE INVENTION

It is an object of the present invention to provide a focus servo control device for preventing focusing errors caused by offset errors generated by an optical system and an electrical circuit in the focusing operation.

In order to achieve the above object of the present invention, there is provided a focus servo control device comprising a drive section for driving an optical system including an objective lens, a detection section for detecting whether the optical system is within a focus servo control range, and a servo control section for forming a focus servo control loop and driving the optical system until the amount of light reflected by the optical disk is detected as a maximum.

BRIEF DESCRIPTION OF THE DRAWINGS

FIGS. 4A and 4B are flow charts for explaining an operation of the device;

DETAILED DESCRIPTION OF THE PREFERRED EMBODIMENT

Figure 1:
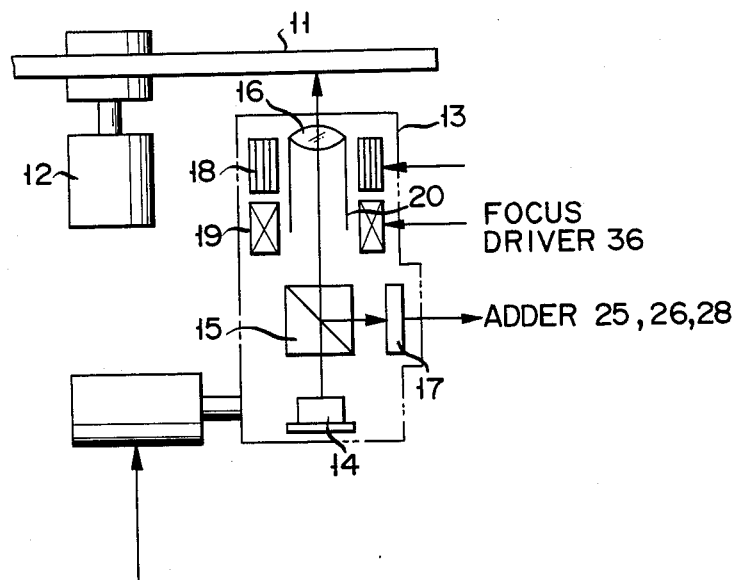
Fig. 1 is a schematic diagram showing an optical head portion controlled by a focus servo control device according to an embodiment of the present invention.

Referring to FIG. 1, optical disk 11 is rotated by motor 12. Optical head 13 is located opposite to disk 11. Head 13 has semiconductor laser 14, beam splitter 15 and objective lens 16, which are on a common optical axis. Photosensor 17 is arranged at one side of splitter 15. Tracking coil 18 and focusing coil 19 are arranged near lens 16. Lens 16 is mounted on actuator 20 and is driven by a servo current supplied to coils 18 and 19. Head 13 is coupled to motor 12 and is driven along the radial direction of disk 11.

Figure 2:
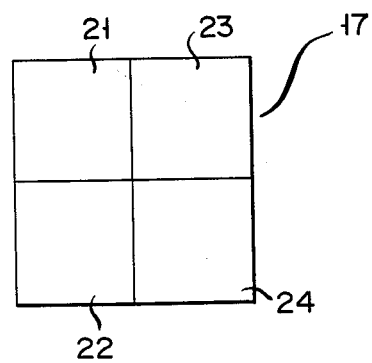
FIG. 2 is a plan view of a photosensor used in the device in FIG. 1.

Photosensor 17 includes four photodiodes 21, 22, 23, and 24, shown in FIG. 2. Photodiodes 21 to 24 constitute four square portions of photosensor 17. Photosensor 17 may be constituted by two photodiodes.

Figure 3:
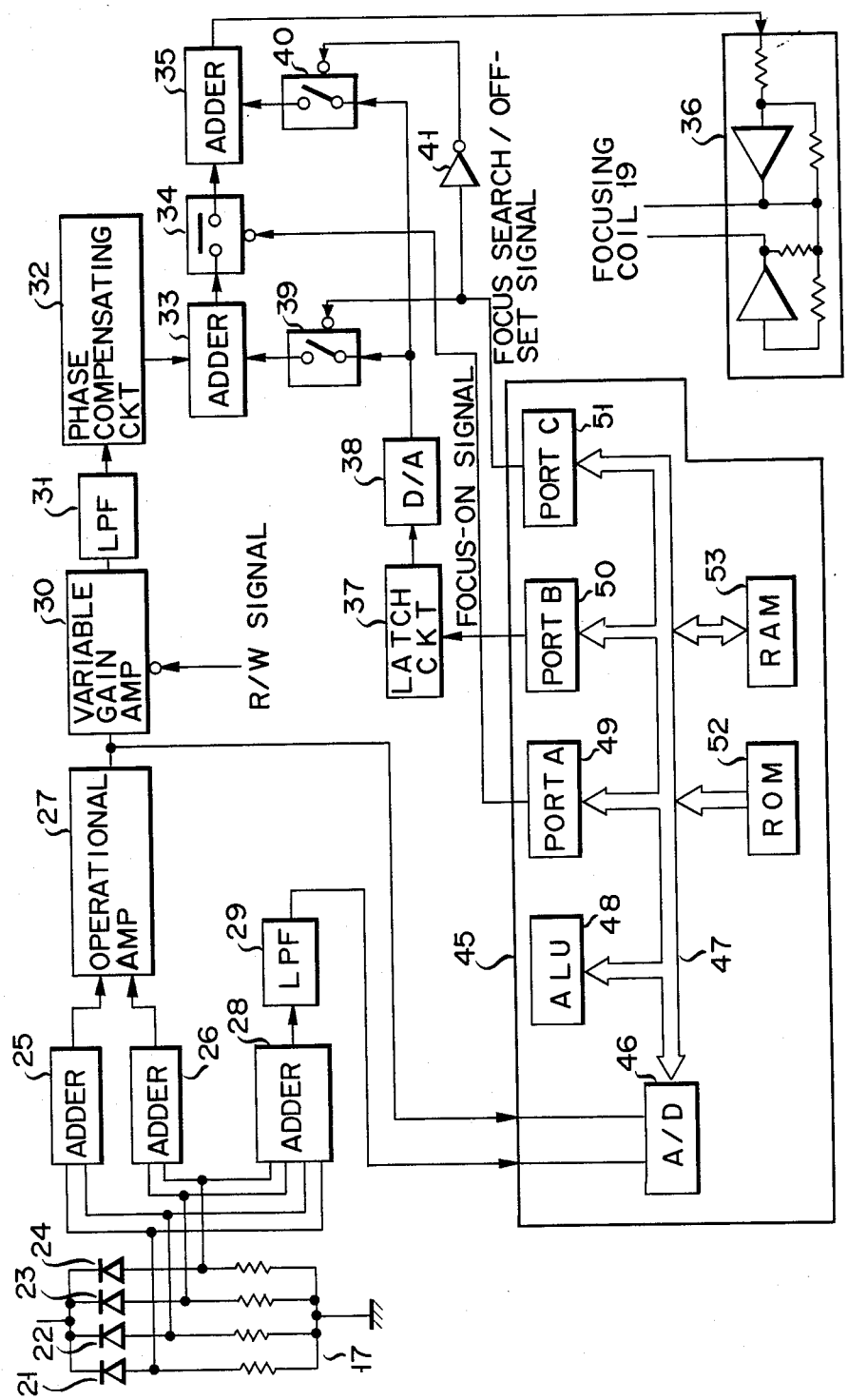
FIG. 3 is a circuit diagram of the focus servo control device according to the embodiment of the present invention.

As shown in FIG. 3, photodiodes 21 and 22 are connected to adder 25, and photodiodes 23 and 24 are connected to adder 26. The output terminals of adders 25 and 26 are connected to the input terminals (noninverting and inverting terminals) of operational amplifier 27. Photodiodes 21 to 24 are also connected to adder 28. The output terminal of adder 28 is connected to CPU 45 through low-pass filter 29.

The output terminal of operational amplifier 27 is connected to variable gain amplifier 30 and CPU 45. Amplifier 30 is constituted by an amplifier, the gain of which can be varied in the write and read modes. The output terminal of amplifier 30 is connected to phase compensating circuit 32 through low-pass filter 31. Circuit 32 is connected to one input terminal of adder 33. The output terminal of adder 33 is connected to adder 35 through switch circuit 34. The output terminal of adder 35 is connected to the input terminal of focus driver circuit 36.

The other input terminal of each of adders 33 and 35 is conneced to D/A converter 38 through switch circuits 39 and 40, respectively. Switch circuits 39 and 40 switch between the focus search mode and the offset elimination mode. Switch circuits 39 is turned off in the search mode but is turned on in the offset elimination mode. Switch circuit 40 is controlled in response to a mode switching signal supplied through inverter 41. Switch circuit 40 is turned off in the offset elimination mode.

Converter 38 is connected to port(B) 50 of CPU 45 through latch circuit 37. Port(C) 51 of CPU 45 is connected to the control terminal of circuit 39 and to the control terminal of circuit 40 through inverter 41. Port(A) 49 of the CPU 45 is connected to the control terminal of circuit 34. The output terminals of circuit 36 are connected to coil 19 and to comparators 43 and 44 through operational amplifier 42. Amplifier 42 and comparators 43 and 44 constitute a voltage detecting circuit.

CPU 45 has A/D converter 46 for converting to digital data an output signal (i.e., a focus error voltage) from amplifier 27 and an output signal (i.e., a DC signal voltage component representing a total amount of light reflected by the disk) from low-pass filter 29. Converter 46 is connected to arithmetic and logic unit (ALU) 48 and ports(A, B, C) 49, 50 and 51 through data bus 47. ROM 52 and RAM 53 are connected to data bus 47. A focusing signal appears at port(A) 49, and a focus search or offset elimination digital signal appears at port(B) 50. A mode switching signal appears at port(C) 51.

The focus error voltage is applied to circuit 36 through filter 31 and circuits 32 and 34, as shown in FIG. 3. Therefore, when circuit 34 is off, only the signal from converter 38 is supplied to circuit 36, and a focus search voltage based on this signal is supplied to coil 19. When circuit 34 is on, the signal based on the focus error voltage and the offset elimination signal from converter 38 are supplied to circuit 36. A drive voltage based on these voltages is supplied to coil 19.

Figure 4B:
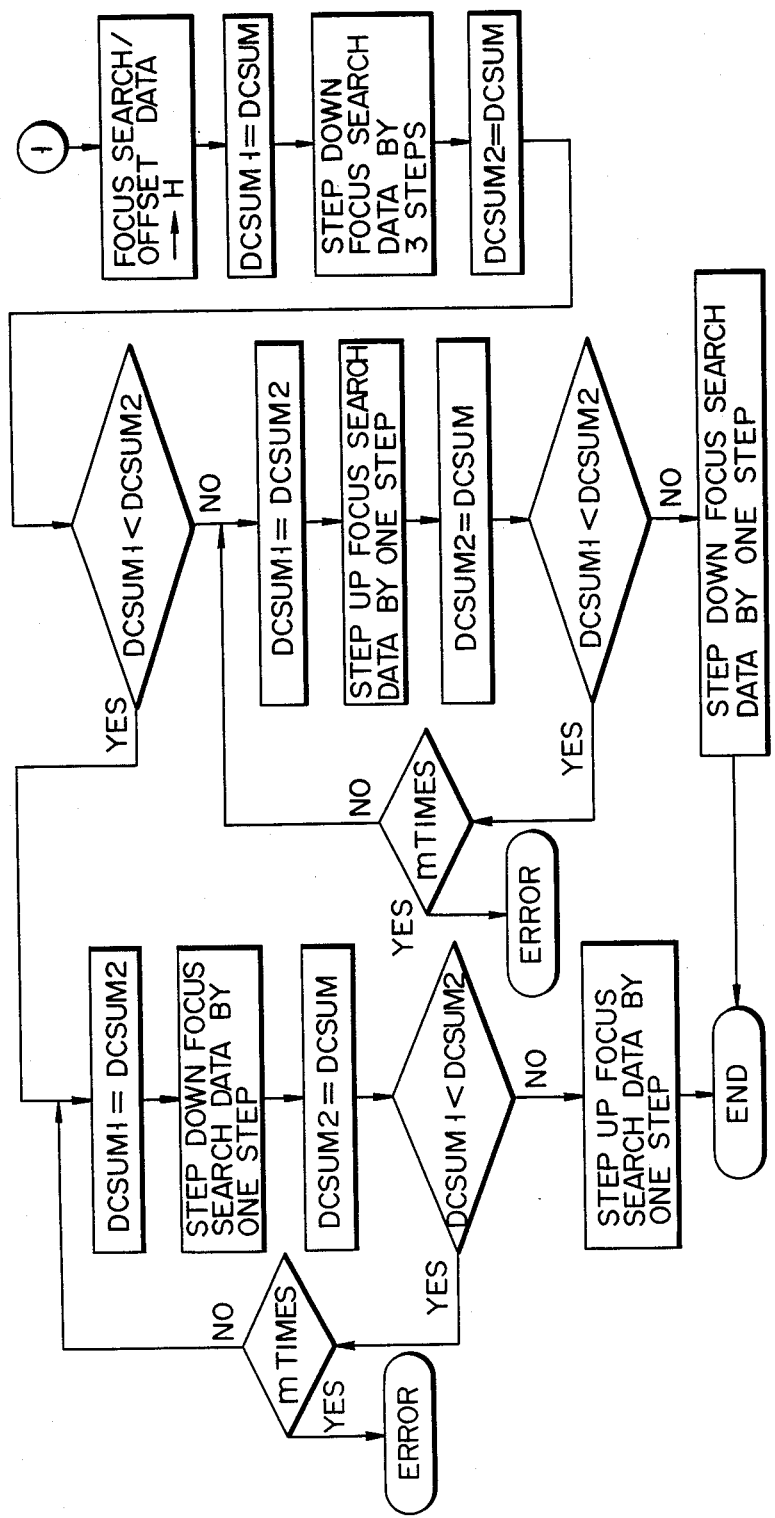

The operation of the focus servo control device will be described with reference to flow charts in FIGS. 4A and 4B. When the device is started, CPU 45 starts focus servo operation in accordance with the program stored in ROM 52. The focus-on and focus search/offset signals generated through ports A and C are set at low level. Switch circuits 34 and 39 are turned off, and switch circuit 40 is turned on. Focus search data corresponding to a position of the optical system including lens 16 which is the nearest to disk 11 is read out from RAM 53 for storing focus search data. The readout focus search data is supplied to circuit 37 through port B. This focus search data is then supplied to driver circuit 36 through converter 38, switch circuit 40 and adder 35. Driver circuit 36 supplies a focus drive current to coil 19. A magnetic field generated by coil 19 upon current supply acts on actuator 20 to move lens 16 to the position nearest to disk 11 within its movable range. When lens 16 reaches the nearest position, focus search data stepped down by one is read out from RAM 53 and is supplied to circuit 37 through port B. One-step down focus search data is supplied to driver circuit 36 through converter 38, switch circuit 40 and adder 35. The optical system is moved away by one step from disk 11.

Figure 5:
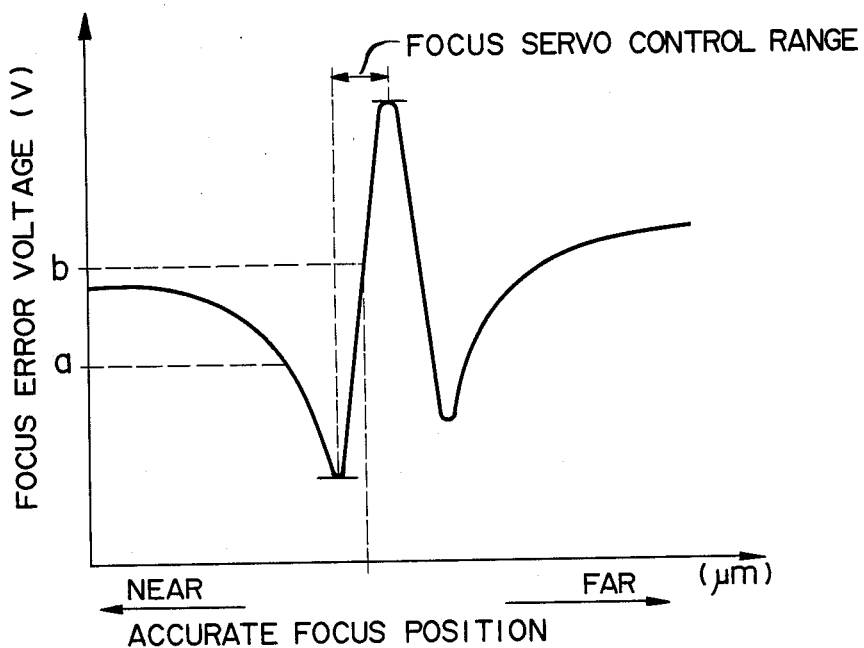
FIG. 5 is a graph showing the focus error voltage of the device in FIG. 1.

When the optical system including lens 16 is moved with respect to disk 11, a focus error voltage is changed, as shown in FIG. 5. More particularly, when the optical system moves from the position nearest to the disk, the focus error voltage is gradually decreased, reaches the minimum value and is then increased again. When the focus error voltage is increased from the minimum value to the maximum value, the voltage is decreased again. A range between the minimum and maximum values is the servo control range for the accurate focus point. Levels a and b in the graph of FIG. 5 are reference values of the decrease and increase ranges, respectively. Upon detection of level a, the decrease range is detected. However, upon detection of level b, the increase range is detected. Servo operation is started in the increase range.

When the focus error voltage is supplied from amplifier 27 to CPU 45, the focus error voltage is compared with reference value a read out from RAM 53. When the input focus error voltage is higher than reference value a, the focus search data is stepped down one by one. Along with the step-down operation, the optical system gradually moves away from disk 11, and the focus error voltage is continuously decreased. When the focus error voltage becomes lower than reference value a, the focus search data is further stepped down by one. When the focus search data is stepped down by n' steps and is not lower than reference value a, CPU 45 determines that a system failure has occurred, and generates an error output.

Figure 7:
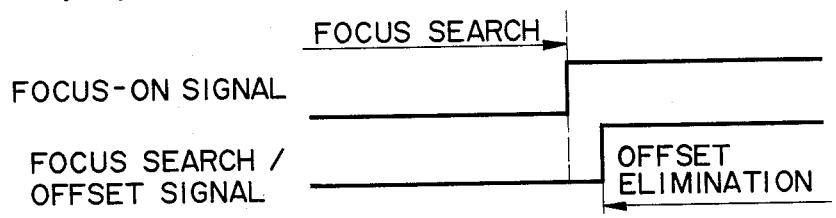
FIG. 7 is a timing chart for explaining an offset elimination operation.

When the focus error voltage is less than reference value a and the focus search data is stepped down by one, the focus error voltage is now compared with reference value b. When the focus error voltage exceeds reference value b, a focus servo loop is formed. In this case, the focus-on signal is set to high level, as shown in FIG. 7. Switch circuit 34 is turned on to form a servo loop. When the focus search data is stepped down by n' steps and does not exceed reference value b, CPU 45 determines that an error has occurred.

When the focus servo loop is formed, the focus error voltage signal obtained through circuit 32, adder 33 and circuit 34 and the focus search signal from converter 38 are supplied to and added by adder 35. A sum signal from adder 35 is supplied to driver circuit 36. Driver circuit 36 drives coil 19 in response to the output signal from adder 33 to move the optical system to the focus point. In this case, the focus point is influenced by offset components and is not a truely accurate focus point. Therefore, the offset elimination mode is executed to eliminate the offset components. For this purpose, a voltage signal generated by adder 28 and converted to a DC signal by LPF 29 is used.

Since the offset elimination mode is started after the focus servo system is stabilized, the mode is actually started t seconds after the focus-on signal is set to high level. More particularly, the focus search/offset signal is set to high level t seconds after the focus-on signal is set to high level, as shown In FIG. 7. The focus search/offset signal of high level turns on switch circuit 39 and turns off switch circuit 40. In this case, the voltage signal from adder 28 is supplied as the detection voltage DCSUM representing total light amount to CPU 45. Voltage DCSUM is stored as detection voltage DCSUM1 in RAM 53.

Figure 6:
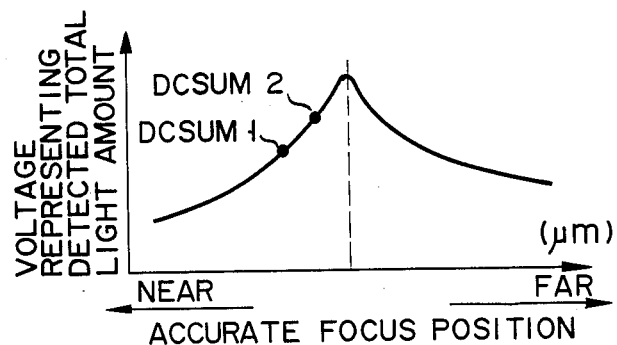
FIG. 6 is a graph showing a voltage generated by the photosensor in the device of FIG. 1 and corresponding to the amount of light.

Voltage DCSUM is a voltage corresponding to a total amount of light reflected by the optical disk and incident on photosensor 17. This voltage is gradually increased when the optical system moves away from the nearest position to disk 11, as shown in FIG. 6. After the voltage reaches the maximum value, it is gradually decreased. The maximum value of this voltage change corresponds to the accurate focus point. In other words, upon detection of the maximum value, the accurate focus point free from the offset components can be obtained.

When voltage DCSUM1 is stored in RAM 53, the focus search data is stepped down by three steps. The stepped-down focus search data serves to move the optical system by three steps. Detection voltage DCSUM from LPF 29 is stored as detection voltage DCSUM2 in RAM 53. When the focusing position is located to the left of the peak in FIG. 6, i.e., when DCSUM is larger than DCSUM1, DCSUM2 is stored as DCSUM1 in RAM 53. In other words, DCSUM1 is updated. Thereafter, focus search data is stepped down by one, and the optical system is moved away from disk by one step. Detection voltage DCSUM is then stored as new DSSUM2 in RAM 53. Condition DCSUM1<DCSUM2 is discriminated. If this condition is satisfied, the focus search data is stepped down again and the optical system is moved by one step. In this manner, when the optical system gradually moves away from the disk and DCSUM1<DCSUM2 is discriminated to be NO, the focus search data is stepped up by one and the corresponding focus search data is retained. This focus search data is new focus point data free from the offset components. In this case, the position of lens 16 corresponds to the peak in FIG. 6.

If condition DCSUM1<DCSUM2 is determined to be NO in the first discrimination step, DCSUM2 is stored as DCSUM1 in RAM 53. In other words, DCSUM1 is updated. Thereafer, the focus search data is stepped up by one, and the optical system is moved toward the disk by one step. Corresponding detection voltage DCSUM is stored as new DCSUM2 in RAM 53. Condition DCSUM1<DCSUM2 is discriminated again. If the condition is satisfied, the focus search data is stepped up by one, and the optical system is accordingly moved toward the disk by one step. Thus, the optical system gradually comes close to the disk. However, when condition DCSUM1<DCSUM2 is not satisfied, the focus search data is stepped down by one step, and the stepped-down focus search data is stored. This focus search data is new accurate focus point data free from the offset components.

In the focus servo control according to the present invention as described above, the focus servo control loop is closed after the optical system including the objective lens (constituting the optical head) and the light source enters the focus servo operation range. Focus servo control can be performed, and at the same time the optical system is driven. Upon driving of the optical system, light reflected by the optical disk and incident on the photosensor is changed. The photosensor detects when the amount of reflected light reaches the maximum. Upon detection, the accurate focus point of the optical system is determined, and the optical system is held at this focus point. Focusing errors based on offset components generated by the optical system and the electrical circuit are eliminated, and a truly accurate focus point can be constantly maintained. In addition, focus control and offset adjustment are automatically performed in the recording/reproduction and reproduction modes under the control of a microcomputer.

In the above embodiment, the objective lens is moved vertically with respect to the optical disk to perform focusing. However, the light source can be moved instead of the objective lens. Alternatively, both the light source and the objective lens can be moved simultaneously.

What is claimed is:

1. A focus servo control device for an optical disk apparatus, comprising:

optical head means including photoelectric means for converting light reflected by a recording disk to at least two electrical signals, and a movable optical means which is movable relative to said disk at least in a direction substantially perpendicular to the disk for focusing a light on said disk, said at least two electrical signals changing upon movement of said optical means relative to said disk;

driving means for driving said movable optical means in said direction substantially perpendicular to said disk;

means for supplying a focus search signal having one of continuously increasing and decreasing levels to said driving means for moving said optical means as a function of said focus search signal;

focus error signal detection means for detecting a difference between said at least two electrical signals, and for generating a focus error signal corresponding to said detected difference;

determining means for determining a focus control range from said focus error signal generated when said optical means is moved relative to said disk by said driving means as said function of said focus search signal;

servo means for servo-controlling movement of said optical means through said driving means within the focus control range determined by said determining means;

light-amount detection means for adding together said at least two electrical signals, and for generating a signal when the sum of said at least two electrical signals indicates that the amount of light incident on said photoelectric means is maximum; and correcting means coupled to said servo means for operating said servo means to move said optical means relative said disk by an amount to correct an offset error of said servo means in accordance with the signal generated by said light amount detection means, for thereby controlling said servo driving means to set said optical means to an accurate focus point free from servo offset errors.

2. The focus servo control device of claim 1, wherein:

said photoelectric means comprises four photosensing sections, each photosensing section providing an output signal; and said focus error signal detection means comprises first adding means for adding together two output signals from said photosensing sections, a second adding means for adding together a remaining two output signals from said photosensing sections, and operational amplifier means for calculating a difference between outputs from said first and second adding means.

3. The focus servo control device of claim 1, wherein:

said photoelectric means comprises a photosensor having four photosensing sections, each photosensing section providing an output signal; and said light-amount detection means comprises adding means for adding together all of the output signals from said photosensing sections.

4. The focus servo control device of claim 1, wherein said determining means comprises means for detecting a range of changes in said focus error signal from a minimum level to a maximum level.

5. The focus servo control device of claim 1, further comprising switch means coupled to said correcting means for enabling said correcting means to operate said servo means after said optical means enters into the focus control range as determined by said determining means.

6. The focus servo control device of claim 5, wherein said switch means is operably responsive to a signal generated by said determining means which is a function of said focus control range determined by said determining means.

* * * * *